Figure 3:
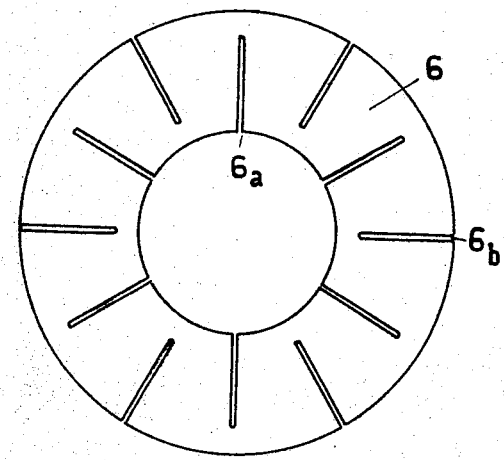

March 14, 1944.　　　　　A. RYBA　　　　　2,344,111
ELECTROMAGNETIC MULTIPLE DISK CLUTCH
Filed Nov. 24, 1939　　　　2 Sheets-Sheet 1
-Fig. 1-
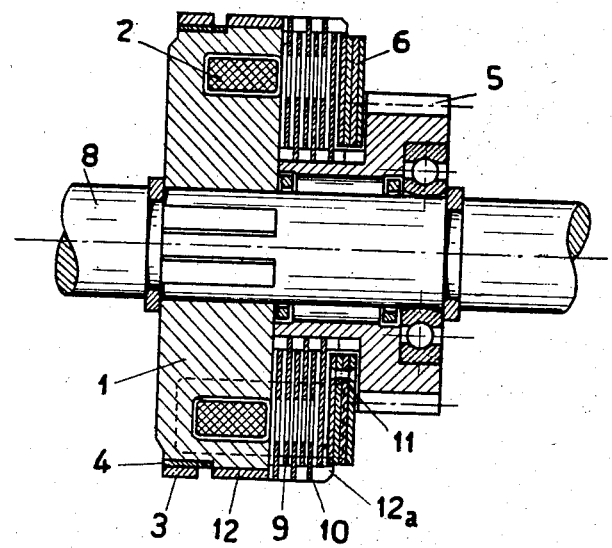
-Fig. 2-
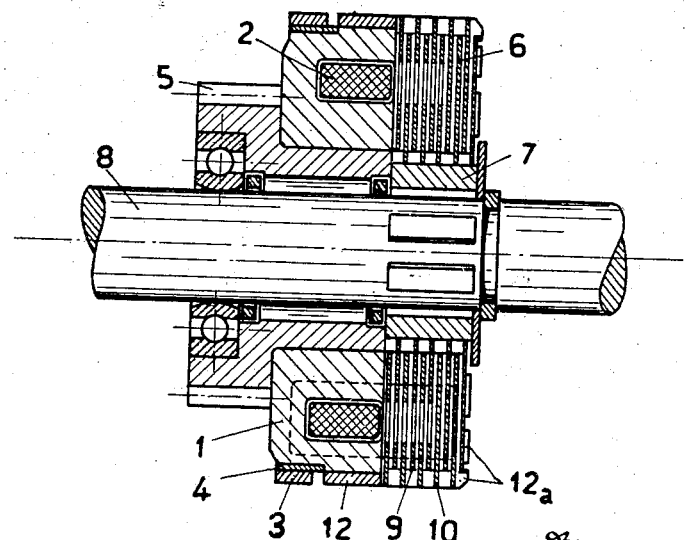
Inventor
Anton Ryba
By Strauch & Hoffman
Attorneys Patented Mar. 14, 1944

2,344,111

UNITED STATES PATENT OFFICE 2,344,111

ELECTROMAGNETIC MULTIPLE-DISK CLUTCH

Anton Ryba, Bolzano, Italy; vested in the Alien Property Custodian

Application November 24, 1939, Serial No. 305,991
In Germany November 24, 1936

2 Claims. (Cl. 192—84)

The present invention relates to electromagnetic multiple-disk clutches as used in change speed gears of power driven vehicles.

As clutches of this kind must have a very high efficiency the friction disks must bear perfectly against each other over their entire surfaces and the magnetic circuit must be closed without intervening air spaces.

This application is a continuation-in-part of my pending U. S. application Ser. No. 176,339 filed November 24, 1937 for "Electromagnetic multiple-disk clutch," now Patent No. 2,254,625, issued Sept. 2, 1941. An object of this invention is to provide an electromagnetic multiple-disk clutch which to a high degree fulfils all the above mentioned requirements.

To this purpose the armature serving as the return path for the magnetic flux, instead of consisting of a single plate, is composed of a plurality of flexible disks which yield upon the action of a magnetic force so that the armature bears with uniform pressure against pole surfaces. Preferably the friction disks are provided with radial slits in order to prevent distortion of the disks due to unequal heating, so that the inner and the outer parts of the disks are able to expand freely, resulting in a uniform loading of the entire friction surface of the disks.

In the accompanying drawings some constructions of clutches according to the invention are shown by way of example.

Figure 4:
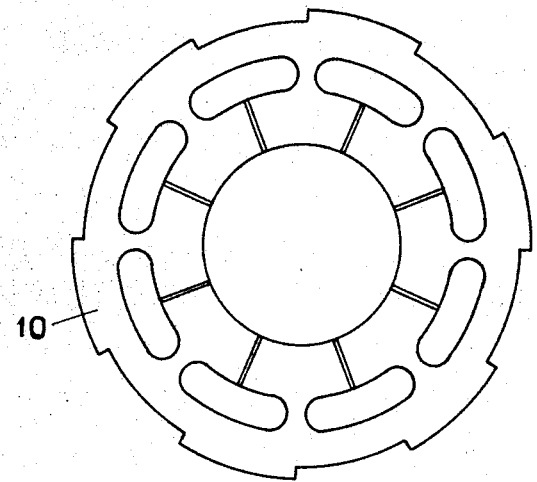
Figure 5:
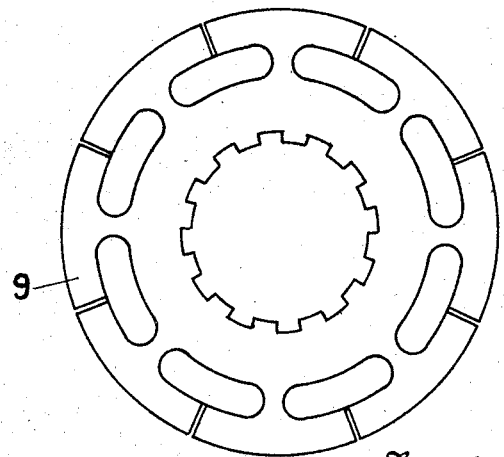

In the drawings:

Fig. 1 is a longitudinal section through a clutch in which the magnetic flux twice traverses the set of disks, Fig. 2 shows a longitudinal section through a clutch in which the armature disks simultaneously serve as friction surfaces, Fig. 3 shows an elevation of an armature disk having slots to increase the flexibility, and, Figs. 4 and 5 show an inner and an outer friction disk with radial slits in order to compensate extensions of heat.

As shown in the drawings a gear wheel 5 is rotatably mounted upon a shaft 8. An electromagnet 1 is, according to Fig. 1, fixed to the shaft 8 and in its annular space carries the exciting coil 2 the two terminals of which are connected to ground on the one hand and to a slip-ring 3 on the other hand. The latter is pressed upon the electromagnet 1 and an insulating layer 4 is arranged between the ring 3 and the electromagnet 1. Connected to the latter is also a ring 12 provided with claws 12a into which engage the outer disks 10. The gear wheel 5 is provided with an elongated hub having notches into which engage the inner discs 9. The armature 6 consists of a plurality of thin flexible disks which, as shown in Fig. 3, may be provided with slots 6a, 6b to increase their flexibility. The armature disks may either all be connected to one clutch member or with neither of the clutch members or alternately with both clutch members. With the exception of the last mentioned case the armature disks may be connected at suitable points, for instance as shown in Fig. 1 by rivets 11. Such connection, however, must be as not to impair the flexibility of the disks.

In the embodiment of Fig. 2, the gear wheel 5 carries the electromagnet 1 and the disks 9 engage with a notched sleeve 7 rigid with the shaft 8. In this manner, the disks forming the armature perform also as friction disks.

Fig. 4 shows an outer disk with slits in the inner ring.

Fig. 5 shows an inner disk with slits in the outer ring. By this means tension due to heat is prevented because the parts of the rings are able to extend. The number of the slits may be varied.

When the circuit is closed a magnetic field is produced as indicated by the dotted line. Thus, the flexible armature disks perfectly uniformly bear against the set of friction disks and thereby warrant a uniform bearing of same at iron closed magnetic circuit.

What I claim is:

1. In an electromagnet multiple-disk clutch, a first clutch member having thereon an electromagnet of substantially annular configuration with an annular outer pole face and a concentric annular inner pole face and with an annular gap therebetween, a second clutch member positioned adjacent said first clutch member, two sets of thin springy annular clutch disks of ferromagnetic material alternately positioned in interleaved engaging relationship with the disks of one set connected at the outer peripheries to one of said clutch members and with the disks of the other set operative connected at their inner peripheries to the other of said clutch members, each of said disks having holes therein substantially in axial alignment with the air gap of said electromagnet, and an annular armature formed of thin springy armature disks and positioned adjacent said clutch disks on the side opposite said electromagnet and forming a radially extending annular bridge closing the magnetic circuit from said inner and outer pole faces through the respective inner and outer annular portions of said clutch disks, said armature disks having radial slots therein which extend substantially the radial dimension of the disk thereby to provide in effect a plurality of sector portions connected at the peripheries by web portions so that each of said armature disks is flexible and, upon energization of said coil, the armature disks will be drawn against said clutch disks and each sector portion will tend to lie flat against the adjacent disk surface.

2. A clutch construction as described in claim 1 wherein said radial slots extend alternately from the inner and outer peripheries of the disks.

ANTON RYBA.